(12) United States Patent
Eronen et al.

(10) Patent No.: US 11,399,254 B2
(45) Date of Patent: Jul. 26, 2022

(54) APPARATUS AND ASSOCIATED METHODS FOR TELECOMMUNICATIONS

(71) Applicant: Nokia Technologies Oy, Espoo (FI)

(72) Inventors: Antti Eronen, Tampere (FI); Miikka Vilermo, Siuro (FI); Arto Lehtiniemi, Lempaala (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/967,341

(22) PCT Filed: Feb. 19, 2019

(86) PCT No.: PCT/EP2019/054080
§ 371 (c)(1),
(2) Date: Aug. 4, 2020

(87) PCT Pub. No.: WO2019/166278
PCT Pub. Date: Sep. 6, 2019

(65) Prior Publication Data
US 2021/0037336 A1 Feb. 4, 2021

(30) Foreign Application Priority Data

Mar. 2, 2018 (EP) ...................... 18159619

(51) Int. Cl.
*H04S 7/00* (2006.01)
*H04M 1/72454* (2021.01)
*H04M 1/60* (2006.01)

(52) U.S. Cl.
CPC ........... *H04S 7/304* (2013.01); *H04M 1/6016* (2013.01); *H04M 1/6058* (2013.01);
(Continued)

(58) Field of Classification Search
CPC combination set(s) only.
See application file for complete search history.

(56) References Cited

U.S. PATENT DOCUMENTS 9,584,946 B1 2/2017 Lyren et al.
9,973,163 B1 * 5/2018 Desmond ............... H03G 5/025
(Continued)

FOREIGN PATENT DOCUMENTS

WO 2010/073193 A1 7/2010

OTHER PUBLICATIONS

Office action received for corresponding European Patent Application No. 18159619.8, dated Nov. 10, 2020, 4 pages.
(Continued)

*Primary Examiner* — Duc Nguyen
*Assistant Examiner* — Assad Mohammed
(74) *Attorney, Agent, or Firm* — Alston & Bird LLP

(57) ABSTRACT

An apparatus configured to, based at least in part on (i) first audio content from a first communication device of a first user, the first user in telecommunication with a second user via a second communication device; and (ii) first-user orientation information indicative of one or more of the orientation and location of the first user relative to a predetermined reference point; provide for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

19 Claims, 4 Drawing Sheets

(52) U.S. Cl.
CPC .... *H04M 1/72454* (2021.01); *H04M 2250/52* (2013.01); *H04R 2499/15* (2013.01); *H04S 2400/11* (2013.01); *H04S 2400/13* (2013.01)

(56) References Cited

U.S. PATENT DOCUMENTS

| | | | |
|---|---|---|---|
| 2013/0275077 A1* | 10/2013 | Kim | G01S 5/186 702/152 |
| 2015/0120305 A1* | 4/2015 | Buck | G10L 25/48 704/275 |
| 2015/0189457 A1* | 7/2015 | Donaldson | H04M 3/56 381/1 |
| 2016/0049915 A1* | 2/2016 | Wang | H03G 3/32 381/107 |
| 2016/0065742 A1* | 3/2016 | Nasir | H04M 3/56 455/416 |
| 2016/0105757 A1 | 4/2016 | Vennström et al. | |
| 2017/0265012 A1 | 9/2017 | Tico et al. | |
| 2017/0295278 A1 | 10/2017 | Lyren et al. | |
| 2018/0035238 A1* | 2/2018 | Norris | H04R 5/04 |
| 2018/0088900 A1* | 3/2018 | Glaser | G06F 3/0482 |

OTHER PUBLICATIONS

Extended European Search Report received for corresponding European Patent Application No. 18159619.8, dated Aug. 2, 2018, 8 pages.

International Search Report and Written Opinion received for corresponding Patent Cooperation Treaty Application No. PCT/EP2019/054080, dated Apr. 1, 2019, 12 pages.

Office action received for corresponding European Patent Application No. 18159619.8, dated Apr. 1, 2020, 4 pages.

Office action received for corresponding European Patent Application No. 18159619.8, dated Apr. 23, 2021, 4 pages.

Office Action for European Application No. 18159619.8 dated Apr. 23, 2021, 4 pages.

* cited by examiner

Figure 7

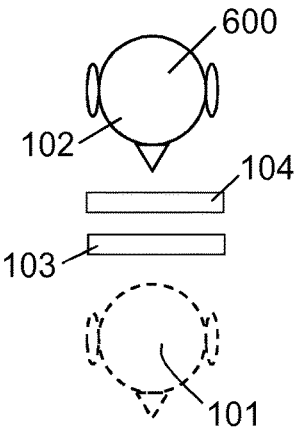

Figure 10

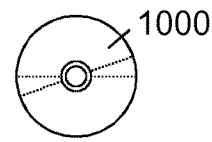

Figure 8

800 — Based at least in part on (i) first audio content from a first communication device of a first user, the first user in telecommunication with a second user via a second communication device; and (ii) first-user orientation information indicative of one or more of the orientation and location of the first user relative to the first communication device;

801 — providing for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

Figure 9

900 — based at least in part on (i) second audio content from a second communication device of a second user, the second user in telecommunication with a first user via a first communication device; and (ii) first-user orientation information indicative of one or more of the orientation and location of the first user relative to a reference point;

901 — providing for presentation of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

APPARATUS AND ASSOCIATED METHODS FOR TELECOMMUNICATIONS

RELATED APPLICATION

This application claims priority to PCT Application No. PCT/EP2019/054080, filed on Feb. 19, 2019, which claims priority to European Application No. 18159619.8, filed on Mar. 2, 2018, each of which is incorporated herein by reference in its entirety.

TECHNICAL FIELD

The present disclosure relates to the field of presentation of audio content in telecommunications and, in particular, to the presentation of audio content using spatial audio during at least audio telecommunication between first and second users. The present disclosure also relates to associated apparatus, methods and computer programs.

BACKGROUND

Telecommunication or telephony systems are being developed that provide for more than monophonic capture and presentation of audio. The presentation of such audio may require careful consideration to ensure the telecommunication is clear and effective.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In an aspect of the disclosure there is provided an apparatus, the apparatus comprising means configured to;
based at least in part on
(i) first audio content from a first communication device of a first user, the first user in telecommunication with a second user via a second communication device; and
(ii) first-user orientation information indicative of one or more of the orientation and location of the first user relative to a predetermined reference point;
provide for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

In one or more examples,
the first condition comprises at least one of (i) the first user facing the predetermined reference point and (ii) the first user being within a predetermined distance of the predetermined reference point; and
the second condition comprises at least one of (ii) the first user facing away from the predetermined reference point and (ii) the first user being further than the predetermined distance from the predetermined reference point.

In one or more examples, the predetermined reference point comprises one of:
(i) the first communication device;
(ii) a display of the first communication device;
(iii) an image indicative of the second user provided to the as part of the telecommunication between the first and second users;
(iv) a live video image of the second user provided as part of the telecommunication between the first and second users; and
(v) an initial orientation of the first user at a start of the telecommunication between the first and second users.

In one or more examples, the first audio content comprises first user audio comprising audio determined to be generated by the first user and ambient audio comprising audio other than that determined to be generated by the first user and the first and second presentation modes provide for different presentation of at least the ambient audio.

In one or more examples, the first and second presentation modes provide for different presentation of the ambient audio in terms of a first audio presentation characteristic; and
the first and second presentation modes provide for one of
(i) different presentation of the first user audio, said different presentation in terms of a second audio presentation characteristic, different to the first audio presentation characteristic and (ii) no difference in presentation of the first user audio.

In one or more examples, the first audio content is presented as spatial audio such that it is perceived as originating from a particular direction or range of directions, and the ambient audio is presented as originating from a different particular direction or range of directions in each of the first and second presentation modes.

In one or more examples, the first presentation mode comprises at least one of:
(i) providing for presentation of the first user audio at a volume greater than the ambient audio of the first audio content;
(ii) providing for presentation of the ambient audio as spatial audio such that it will be perceived by the second user as originating from a smaller range of directions than in the second presentation mode;
(iii) providing for presentation of the ambient audio as spatial audio solely from a direction in front of the second user;
(iv) providing for presentation of the first user audio as spatial audio from a direction in front of the second user;
(v) providing for presentation of the first user audio as spatial audio to be perceived as originating from a first location in front of the second user and providing for presentation of the ambient audio as spatial audio to be perceived as originating from a second location in front of the second user further from the second user than the first location.

In one or more examples, the second presentation mode comprises at least one of:
(i) providing for presentation of the ambient audio at a greater volume than in the first presentation mode;
(ii) providing for presentation of the ambient audio as spatial audio such that it will be perceived by the second user as originating from a greater range of directions than in the first presentation mode.

In one or more examples, one or more of:
i) the first audio content comprises audio-type information which designates which audio of the first audio content comprises ambient audio and which audio comprises audio generated by the first user; and ii) the presentation of the first audio content is based on audio analysis of the first audio content to identify which audio of the first audio content comprises ambient audio and which audio comprises first user audio generated by the first user.

In one or more examples, the first audio content comprises first spatial audio content, the first spatial audio content comprising the ambient audio and information indicative of at least the direction from which the ambient audio was captured, the apparatus configured to provide for presentation of the first spatial audio content at the second communication device as spatial audio at least in one of the first and second presentation modes.

In one or more examples, the provision of the presentation of the first audio content is further based on a determination that the volume of the first audio content is greater than a predetermined threshold level;

wherein the apparatus is configured, if the volume of the first audio content is less than the predetermined threshold level, to provide for presentation of the first audio content independently of the first-user orientation information.

In one or more embodiments, the provision of the presentation of the first audio content is based on a determination that the volume of the ambient audio of the first audio content is greater than the predetermined threshold level. In one or more embodiments, the predetermined threshold level is based on the volume of ambient audio captured by the second communication device. In one or more examples, the apparatus provides for said presentation based on which of the first and second user has the ambient audio of the greatest volume.

In one or more examples, the first-user orientation information is based at least in part on camera imagery captured by the first user device of the first user during said telecommunication.

In one or more embodiments, the apparatus is provided at one of:
(i) the second user device;
(ii) a server in communication with the second user device;
(iii) the first user device; and
(iv) a combination of two or more of the above as a distributed apparatus.

In a further aspect there is provided an apparatus, the apparatus comprising means configured to:
based at least in part on
(i) second audio content from a second communication device of a second user, the second user in telecommunication with a first user via a first communication device; and
(ii) first-user orientation information indicative of one or more of the orientation and location of the first user relative to a reference point;
provide for presentation of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

In one or more examples, the second audio content comprises second user audio comprising audio determined to be generated by the second user and second ambient audio comprising audio other than that generated by the second user that is captured by the second communication device; and
in the first presentation mode, provide for presentation of the second ambient audio; and
in the second presentation mode, one of (i) provide for presentation of the second ambient audio at a lower volume than in the first presentation mode and (ii) do not provide for presentation of the second ambient audio.

In a further aspect there is provided a method, the method comprising:
based at least in part on
(i) first audio content from a first communication device of a first user, the first user in telecommunication with a second user via a second communication device; and
(ii) first-user orientation information indicative of one or more of the orientation and location of the first user relative to a predetermined reference point;
providing for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

In a further aspect there is provided a computer readable medium comprising computer program code stored thereon, the computer readable medium and computer program code being configured to, when run on at least one processor, perform the method of:
based at least in part on
(i) first audio content from a first communication device of a first user, the first user in telecommunication with a second user via a second communication device; and
(ii) first-user orientation information indicative of one or more of the orientation and location of the first user relative to a predetermined reference point;
providing for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

In a further example aspect there is provided an apparatus comprising:
at least one processor; and
at least one memory including computer program code,
the at least one memory and the computer program code configured to, with the at least one processor, cause the apparatus to perform at least the following:
based at least in part on
(i) first audio content from a first communication device of a first user, the first user in telecommunication with a second user via a second communication device; and
(ii) first-user orientation information indicative of one or more of the orientation and location of the first user relative to a predetermined reference point;
provide for presentation of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

In a further aspect there is provided a method, the method comprising:

based at least in part on
(i) second audio content from a second communication device of a second user, the second user in telecommunication with a first user via a first communication device; and
(ii) first-user orientation information indicative of one or more of the orientation and location of the first user relative to a reference point;
providing for presentation of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

In a further aspect there is provided a computer readable medium comprising computer program code stored thereon, the computer readable medium and computer program code being configured to, when run on at least one processor, perform the method of:

based at least in part on
(i) second audio content from a second communication device of a second user, the second user in telecommunication with a first user via a first communication device; and
(ii) first-user orientation information indicative of one or more of the orientation and location of the first user relative to a reference point;
providing for presentation of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

In a further example aspect there is provided an apparatus comprising:

at least one processor; and
at least one memory including computer program code,
the at least one memory and the computer program code configured to, with the at least one processor, cause the apparatus to perform at least the following:
based at least in part on
(i) second audio content from a second communication device of a second user, the second user in telecommunication with a first user via a first communication device; and
(ii) first-user orientation information indicative of one or more of the orientation and location of the first user relative to a reference point;
providing for presentation of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

In a further aspect we provide an apparatus, the apparatus comprising means configured to:

based at least in part on
(i) audio content from a remote communication device of a remote user, the remote user in telecommunication with a local user via the remote communication device and a local communication device of the local user; and
(ii) user orientation information indicative of one or more of the orientation and location of one of the remote user and the local user relative to a predetermined reference point;
provide for presentation of the audio content at the local communication device in a first presentation mode when the user orientation information is indicative of a first condition and in a second presentation mode, different to the first, when the user orientation information is indicative of a second condition different to the first condition, the first and second presentation modes providing for different presentation of the first audio content.

In one or more examples, one of:
(i) the remote communication device and the remote user comprise a first communication device and a first user respectively, and the local communication device and the local user comprise a second communication device and a second user respectively, and the user orientation information relates to said first user; and
(ii) the remote communication device and the remote user comprise a second communication device and a second user respectively, and the local communication device and the local user comprise a first communication device and a first user, and the user orientation information relates to said first user.

The optional features of the above aspects and described herein apply equally to this further aspect.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 7 shows a second diagram to illustrate an example of the presentation of audio to a first user based on the orientation of the first user;

FIG. 8 shows a flowchart illustrating an example method

FIG. 9 shows a flowchart illustrating an example method; and

FIG. 10 shows a computer readable medium.

DESCRIPTION OF EXAMPLE ASPECTS

Figure 1:
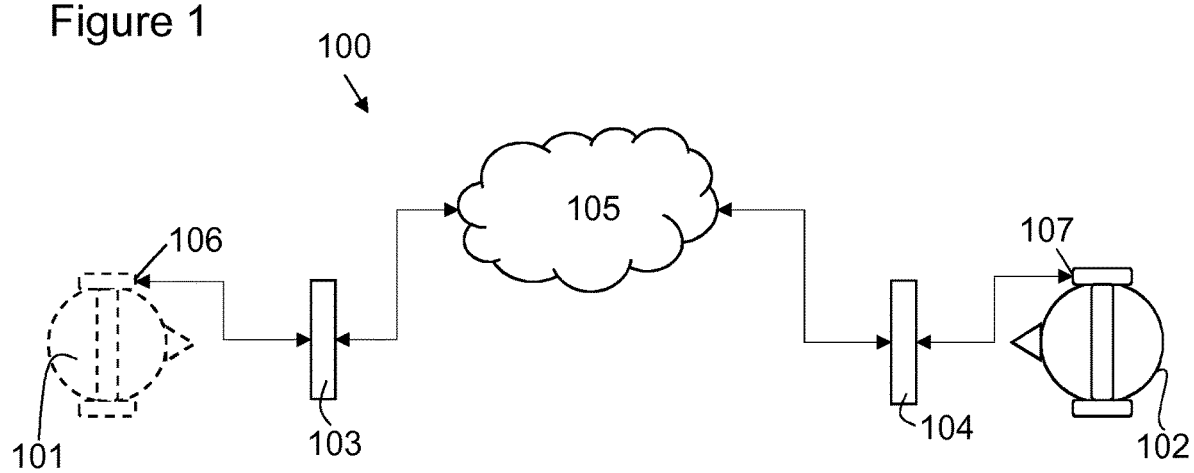
FIG. 1 illustrates an example overview of a first user and second user in telecommunication.

Telecommunication or telephony systems are being developed that provide for more than monophonic capture and monophonic presentation of audio. Immersive telephony systems are being developed, such as by the 3rd Generation Partnership Project (3GPP), that will enable a new level of immersion in telephony services. Such systems may provide for transmission of and presentation of immersive, spatial audio content. This may enable receiving and sending of an enveloping sound scene from/to the telecommunication call participants. Thus, when a first user calls to a second user, the first user can experience the audio environment around the second user as if he/she was physically located at the location of the first user and vice versa. Accordingly, the direction from which audio was received at the location of the first user may be reproduced when presenting the audio to the second user by use of spatial audio presentation.

Spatial audio comprises audio presented in such a way to a user that it is perceived to originate from a particular location, as if the source of the audio was located at that particular location. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from points or directions in real-world in accordance with the directional information.

In one or more examples, non-spatial audio content may be presented as spatial audio. Thus, "conventional" monophonic or stereophonic audio may be provided for presentation such that it will be perceived to originate from a particular location or direction. One or more of the embodiments described herein may present spatial audio based on spatial audio content or non-spatial audio content.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio.

Spatial audio may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio.

In one or more examples, an apparatus may be provided that is configured to provide for presentation of first audio content from a first user received via a first communication device to a second user in different ways based on one or more of the orientation and location of the first user relative to a reference point in the vicinity of the first user, such as relative to their first communication device.

FIG. 1 shows an example overview of a system 100 in which such an apparatus may be used. In particular, FIG. 1 shows a first user 101 having a first communication device 103 and a second user 102 having a second communication device 104 engaging in a telecommunication session using the communication devices 103, 104. The telecommunication session may be provided via a network 105. The network may include one or more telecommunication hosts, such as servers, which may provide the telecommunication service for the communication devices 103, 104. In one or more examples, the communication devices 103, 104 may provide the telecommunication session in a peer-to-peer manner without telecommunication hosts or servers. In either case, the first and second communication devices 103, 104 may include telecommunication functionality for providing a telephony service for the first user 101 and the second user 102.

The first communication device 103 may be configured to capture audio, at least in part, generated by the first user 101 (i.e. utterances of the first user 101) as well as ambient audio comprising other audio generated in the vicinity of the first communication device 103 and/or first user 101. The first communication device 103 may include one or more microphones or microphone arrays of a plurality of microphones to perform such a function and/or may receive audio information captured by remote microphones such as from a head-mounted or lavalier microphone (not shown) worn by the first user 101. Accordingly, the first communication device 103 may provide first audio content comprising at least the audio it captured for use in communication with the second user 102. The first communication device 103 may also provide for presentation of audio to the first user 101 via speakers or headphones 106. The first communication device 103 may be configured to present audio as spatial audio. The first communication device 103 may be configured to capture audio as spatial audio content, such that it is associated with directional information indicative of the direction or location from which it was captured.

Likewise, the second communication device 104 may be configured to capture audio, at least in part, generated by the second user 102 (i.e. utterances of the second user 102) as well as ambient audio comprising other audio generated in the vicinity of the second communication device 104 and/or second user 102. The second communication device 104 may include one or more microphones or microphone arrays of a plurality of microphones to perform such a function and/or may receive audio information captured by remote microphones such as from a head-mounted or lavalier microphone (not shown) worn by the second user 102. Accordingly, the second communication device 104 may provide second audio content comprising at least the audio it captured for use in communication with the first user 101. The second communication device 104 may also provide for presentation of audio to the second user 102 via speakers or headphones 107. The second communication device 104 may be configured to present audio as spatial audio. The second communication device 104 may be configured to capture audio as spatial audio content, such that it is associated with directional information indicative of the direction or location from which it was captured.

Figure 2:
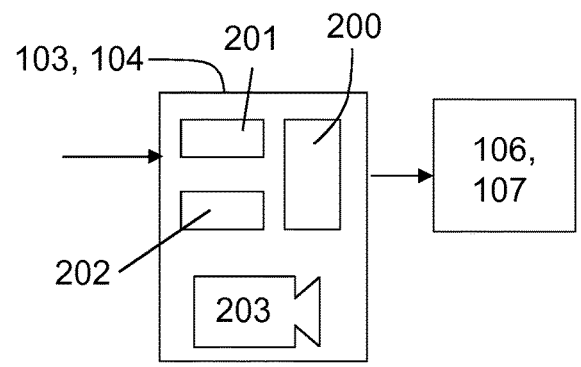
FIG. 2 shows an example apparatus for presenting at least audio for a user in telecommunication with a second user.

FIG. 2 shows an example apparatus 200 for providing for presentation of audio content received as part of the telecommunication between the first and second users 101, 102. The example apparatus 200 may form part of the first and/or second communication devices 103, 104 or part of a telecommunication host or server or may be distributed over any combination of the above. The apparatus 200 may control the first and/or second communication devices 103, 104. In other examples, the apparatus 200 may comprise the first and/or second communication devices 103, 104 and may provide for presentation of the audio content from the other user, as will be explained below, as well as provide the telecommunication functionality and one or more other functions. In this example of FIG. 2, the apparatus 200 is shown as part of the first and/or second communication devices 103, 104.

The apparatus 200 may comprise or be connected to a processor 201 and a memory 202 and may be configured to execute computer program code. The apparatus 200 may have only one processor 201 and one memory 202 but it will be appreciated that other embodiments may utilise more than one processor and/or more than one memory (e.g. same or different processor/memory types). Further, the apparatus 200 may be an Application Specific Integrated Circuit (ASIC).

The processor may be a general purpose processor dedicated to executing/processing information received from other components, such as received from the network 105 as part of the telecommunication session with the other user's device, in accordance with instructions stored in the form of computer program code in the memory. The output signalling generated by such operations of the processor is provided onwards to further components, such as to headphones 106, 107.

The memory 202 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood, in one or more example embodiments, to provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The first and/or second communication devices 103, 104 may include a user facing camera 203 for use in determining the orientation of the respective user relative to the respective first/second communication device 103, 104. Accordingly, a determination of whether the user is looking towards or not towards the respective first/second communication device 103, 104 or a reference point may be made and, optionally, the orientation of the user with more granularity. In one or more examples, the camera 203 may also be used to determine the distance of the user from the respective first/second communication device or a reference point. It will be appreciated that other sensors, including or excluding the camera 203 may be used for determination of user orientation or user distance relative to the respective first/second communication device 103, 104 or reference point. As will be described below the orientation of the user of the respective first/second communication device may be used to control the presentation of audio for them and the other user party to the telecommunication call.

Figure 3:
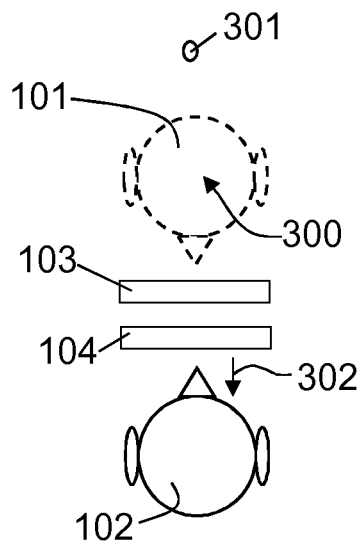
FIG. 3 shows a first diagram to illustrate an example of the presentation of audio to a second user based on the orientation of the first user.

Example FIG. 3 is illustrative of how the apparatus 200 provides for presentation of first audio content to the second user 102 at the second communication device 104. The first audio content comprises audio content received from the first communication device 103 of the first user 101 by the second communication device 104 of the second user 102. Thus, the first user 101 is in telecommunication with the second user 102 and the first audio content comprises, for example, speech and ambient sounds from the first user 101 and their environment which is for presentation to the second user 102 to provide the communication therebetween.

The apparatus 200 may further receive first-user orientation information indicative of one or more of the orientation and location of the first user 101 relative to a reference point, which in this example comprises the first communication device 103.

The apparatus 200, based on (i) the first audio content and (ii) the first-user orientation information; is configured to provide for presentation of the first audio content at the second communication device 104 in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

The first and second conditions may thus comprise a predetermined, particular orientation or a predetermined, particular location or a predetermined range of orientations or locations.

FIG. 3 illustrates an example first condition. The first condition comprises the first user 101 facing their first communication device 103, which may be determined from the camera 203. Thus, the reference point, in this example, comprises the first communication device 103. In one or more examples, the first condition may be considered to be the first user 101 looking towards the second user 102, who may be visually displayed on a screen of the first communication device 103 or by another display means, such as a holographic display or augmented or virtual reality display. Accordingly, the first user 101 is shown in plan view facing their device 103. In this condition, as mentioned above, the first audio content is presented in the first presentation mode.

In more general terms, the predetermined reference point may comprise any point the first user's 101 orientation or location can be determined relative to. For example, the predetermined reference point may comprise, as in the example above, the first communication device 103 and therefore a sensor, such as camera 203 or a proximity sensor, associated with the first communication device may be used. In other examples, the predetermined reference point may comprise a display of the first communication device, such as a display of a mobile telecommunication device. In other examples, the predetermined reference point may comprise an image indicative of the second user 102 provided for the first user 101 as part of the telecommunication between the first and second users, wherein the image may comprise a contact picture from the first user's phonebook, for example, which may be displayed on a screen, virtual/augmented reality headset or projected from a projector to a point in space that serves as the reference point. Similarly, the predetermined reference point may, in one or more examples, comprise a live video image of the second user 102 provided as part of the telecommunication between the first and second users. Thus, one or more sensors of the device 103 or remote sensor(s) may be used to determine the location or orientation of the first user relative to the image/live image. In one or more examples, the reference point comprises an initial orientation and/or location of the first user 101 at a start of the telecommunication between the first and second users. Thus, orientation sensors, such as accelerometers may be used to determine a change in the orientation/location of the first communication device 103 and therefore the first user 101 relative to the first user's initial orientation/location when the telecommunication started (or some other time).

Various examples of how the first presentation mode may differ from the second presentation mode will be discussed below. In one or more examples, the first audio content may be divided into one or more types. In this and other examples, the first audio content comprises first user audio comprising audio determined to be generated by the first user 101 and ambient audio comprising audio other than that determined to be generated by the first user 101 and the first and second presentation modes provide for different presentation of at least the ambient audio. The ambient audio may thus comprise audio captured from the vicinity of the first user 101 by one or more microphones, such as microphones of the first communication device 103.

Thus, in one or more examples, the audio of the first audio content may be labelled with a category comprising either ambient audio or first user audio. In one or more examples, the labelling of the audio may be performed at the first user device 103 at the time of capture. In such an example, the first audio content may be separated into a first user audio stream and an ambient audio stream. In one or more examples, a server may perform the labelling of the audio and/or creation of said different component audio streams. In one or more examples, the second user device 104 may be configured to determine which audio is first user audio and which is ambient audio. In any of the examples, the determination of first user audio from ambient audio may be performed using any appropriate audio analysis technique and may be based on the frequency range of the audio at a particular time, the degree of reverberation, the volume or any other audiological factor. The determination of first user audio from ambient audio may be performed based on predetermined speech samples of the first user 101. In other examples, the first audio content may be recorded by a plurality of microphones and may be determined to be first user audio or ambient audio based on differences between how the audio was captured by the plurality of microphones. For example, audio deemed to be received at a greater volume or with a particular degree of reverberation by a front facing microphone relative to a rear facing microphone may be deemed to be first user audio (possibly once subject to audio processing). The remaining audio or audio received at a greater volume or with a particular degree of reverberation by the rear facing microphone relative to the front facing microphone may be determined to be ambient audio (possibly once subject to audio processing). It will be appreciated that various audio processing techniques may be used to separate the first user audio and the ambient audio.

Depending on where the processing of the first audio content into first user audio and ambient audio occurs, the first audio content may include audio-type information which designates which audio of the first audio content comprises ambient audio and which audio comprises audio generated by the first user 101. Accordingly, if the presentation modes require different presentation of the first user audio and ambient audio, the relevant audio data can be identified by the audio-type information. In other examples, the presentation of the first audio content is based on audio analysis of the first audio content to identify which audio of the first audio content comprises ambient audio and which audio comprises audio generated by the first user 101. Thus, the first audio content may be received by the second communication device 104 without audio-type information and the apparatus 200 may provide for identification of the first user audio and ambient audio in the first audio content based on the audio analysis.

Further, in this example embodiment, the second audio device 104 is configured to present the first audio content as spatial audio such that it is perceived as originating from one or both of a particular direction and a particular location in space.

Returning to the first presentation mode illustrated in example FIG. 3, the first user audio may be presented as spatial audio from a direction 302 in front of the second user 102. The direction "in front of the second user 102" may be determined based on the location of the second communication device 104 relative to the second user 102 such that the audio is perceived to originate from whatever direction the device 104 is being held. In one or more examples, said direction may be based on whatever direction the second user is determined to be looking or perhaps the direction they were looking when the telecommunication call started. In other examples, where an image received from the first communication device 103, such as of the first user 101, is provided for display to the second user 102, the first user audio may be presented as spatial audio such that it appears to originate from the image. In this example, the first user audio may be presented as spatial audio such that it is perceived to originate from the direction 302, although it may be presented such that it is perceived from a specific location, such as location 300 designated by the plan view of the first user's 101 head.

Further, in this example of the first presentation mode, the ambient audio is presented as spatial audio such that it is perceived to originate from a narrow range of directions or point designated by location 301. In one or more examples, the location 301 may be behind the location 300 from which the second user 102 perceives the first user audio. Accordingly, in one or more examples, the ambient audio may be presented with a reduced volume and/or increased reverberation to create the perception of its origin being further from the location 300.

In the first presentation mode, the first user audio may be considered to be presented clearly as the first user 101 is looking towards the second user 102 (e.g. the first user is looking at their first communication device 103 or image of the second user 102) and it may be assumed they have the intention of talking directly to the second user 102. The ambient audio, which may comprise spatial audio content and therefore capable of being presented such that it may recreate the audio scene experienced by the first user 101 is, instead, presented in a non-intrusive fashion from location 301. This may avoid the immersive and therefore somewhat distracting nature of ambient audio that comprises spatial audio content so that the second user 102 can clearly hear the first user 101.

Figure 4:
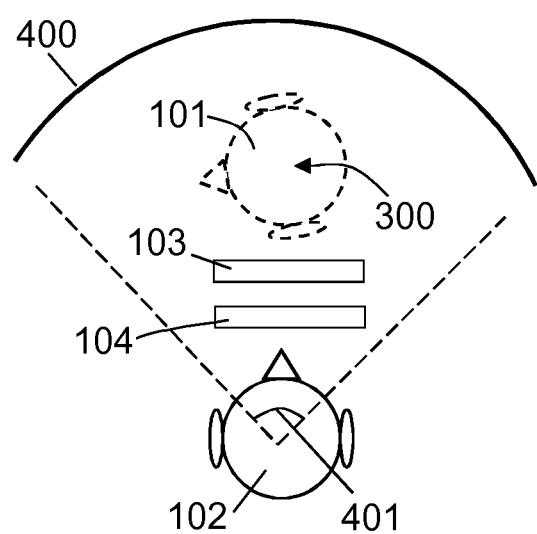
FIG. 4 shows a second diagram to illustrate an example of the presentation of audio to a second user based on the orientation of the first user.

FIG. 4 illustrates an example second condition. The second condition comprises the first user 101 facing away or not looking directly towards their first user communication device 103, which may be determined from the camera 203. As discussed above, the orientation or location of the first user 101 may be determined relative to a different reference point. In one or more examples, the second condition may be considered to be the first user 101 looking away from the second user 102, who may be visually displayed on a screen of the first communication device 103 or by another display means, such as a holographic display. Accordingly, the first user 101 is shown in plan view facing away from their device 103. In this condition, the first audio content is presented in the second presentation mode.

In this example, the ambient audio is presented differently in the first and second presentation modes in terms of one of (i) the particular direction or range of directions from which it is perceived to originate and (ii) the particular location from which it is perceived to originate.

In the previous example, in the first presentation mode the ambient audio of the first audio content was presented as spatial audio to be perceived as originating from point 301. However, in the second presentation mode, the ambient audio of the first audio content is presented as spatial audio to be perceived as originating from a range of directions represented by line 400 relative to the second user 102. As mentioned above, the ambient audio may comprise spatial audio content and therefore include directional information from, for example, 360° around the first user 101. Thus, in one or more examples, the range of directions over which the spatial audio ambient audio is presented may be cropped (such that some of the ambient audio from directions outside the crop region is discarded) or compressed (such that the spatial audio ambient audio content is presented from a narrower range of directions) to be perceived as having an origin within the range of directions shown by line 400 and angle 401.

In this example, when it is considered that the first user 101 does not intend to directly address the second user (the second condition) because they are looking away from their first communication device 103, the second presentation mode allows for the second user 102 to hear the ambient audio over a greater range of directions and therefore appreciate the aural experience experienced by the first user 101. The second presentation mode, in one or more examples may also provide for increasing the volume of the ambient audio relative to the first presentation mode.

The first and second presentation modes may be applied using audio modifying effects selected based on the first-user orientation information.

In terms of the first user audio of the first audio content, no change in the way it is presented may be provided between the first and second presentation modes. Accordingly, if the first user 101 were to talk while oriented in accordance with the second condition (e.g. FIG. 4) their first user audio would continue to be presented such that it is perceived to originate from point 300 in front of the second user 102. However, it will be appreciated that in other examples, the first and second presentation modes may define different audio modifying effects for the first user audio. Further, the different presentation modes may provide for a change in the ambient audio in a different way to any change provided for in the first user audio. Thus, the first and second presentation modes may provide for different presentation of the ambient audio in terms of a first audio presentation characteristic, which in the above example comprises spatial audio perceived origin location. Further, the first and second presentation modes may provide for one of (i) different presentation of the first user audio, said different presentation in terms of a second audio presentation characteristic, different to the first audio presentation characteristic and (ii) no difference in presentation of the first user audio. Thus, the second presentation characteristic may be spatial audio perceived origin location, but the location may differ. In other examples, the second presentation characteristic may comprise volume while the first audio presentation characteristic comprises spatial audio perceived origin location.

As an example of the application of the apparatus 200, the first user 101 may be at a music concert. On one hand, the second user 102 who is not at the concert wants to hear the voice of the first user (the first user audio) without the music of the concert (the ambient audio) disturbing the telecommunication call too much. On the other hand, the second user 102 may, at times during the telecommunication, wish to experience the same aural experience as the first user 101, such as when the first user 101 is not talking to them. Furthermore, the first user 101 at the concert may wish to intuitively control when the second user hears the concert (the ambient audio) and when they hear them (the first user audio). The use of the first and second conditions based on user orientation and/or location may provide for intuitive control of the application of the first and second presentation modes.

The apparatus 200 may perform the above-mentioned functionality in different ways. For example, where the apparatus 200 is part of the first communication device 103, the determination of the first user audio and the ambient audio may be performed at the first communication device 103 or remotely under the control of the apparatus 200. Further, the first-user orientation information, which may be provided from the camera 203, may result in the apparatus 200 providing for modification of the captured first audio content post-capture or providing for capture of the first audio content in different ways prior to sending the first audio content to the second user device 104. For example, in the first condition, the apparatus 200 may provide for capture of the ambient audio monophonically, because spatial audio directional information would not be required when the ambient audio is configured to be presented from point 301 at the second communication device 104 in accordance with the above-mentioned examples. Alternatively, the first audio content may be captured as spatial audio and the apparatus 200 may provide for its modification so that when presented at the second communication device the ambient audio is presented from point 301 and the first user audio from point 300. Thus, this may reduce network bandwidth as the apparatus 200 knows how the first audio content should be rendered at the second user device 104. Likewise, for example, when the first-user orientation information is indicative of the second condition, the apparatus 200 may provide for capture and/or modification of the first audio content so that it is configured for presentation as exemplified in FIG. 4 or any other configuration defined by the second presentation mode. Thus, in one or more examples, based on the first-user orientation information, at least the ambient audio (and possibly the first user audio) of the first audio content may be captured as spatial audio content or not, such as monophonically or stereophonically. Further, in one or more examples, based on the first-user orientation information, at least the ambient audio (and possibly the first user audio) of the first audio content may be modified prior to sending to the second communication device 104 to provide the first audio content in a form for presentation in accordance with the appropriate presentation mode.

When the apparatus 200 is part of the second communication device 104, the first audio content may comprise spatial audio content irrespective of first-user orientation information. Accordingly, the apparatus 200 may provide for modification of the spatial audio ambient audio and the spatial audio first user audio in accordance with the first and second presentation modes. Similarly, where the apparatus 200 is part of a server intermediate to the first and second communication devices 103, 104 in a telecommunication network therebetween, the apparatus 200 may receive spatial audio content irrespective of first-user orientation information and, based on the first-user orientation information, provide for modification of the spatial audio ambient audio and the spatial audio first user audio in accordance with the first and second presentation modes prior to forwarding the first audio content on to the second communication device 104.

In the above example, the first condition comprises the first user 101 facing the first communication device 103 or an (e.g. live) image of the second user 102, presented to the first user 101, which may be provided by the first communication device 103; and the second condition comprises the first user 101 facing away from the first communication device 103 or facing away from an (e.g. live) image of the second user 102, presented to the first user 101, which may be provided by the first communication device 103. However, in other examples, the first and second presentation modes may be intuitively controlled by the first user 101 bringing the first communication device 103 close to their face or further from their face. Thus, the first condition may comprise the first user 101 being within a predetermined distance of the first communication device 103 (or the face of the first user 101 being within a predetermined distance, determined by camera 203 or any other sensor); and the second condition may comprise the first user 101 (or their face, determined by camera 203 or any other sensor) being further than the predetermined distance from first communication device 103. In other examples, reference points other than the first communication device 103 may be used in the same way. In one or more examples, the first condition and the second condition may be alternatives of the same orientation-based or location-based parameter relative to the reference point. Thus, the first and second condition may comprise "looking towards the reference point" and "looking away from the reference point" wherein the parameter is the direction the user is looking. As another example, the first and second condition may comprise "near the reference point" or "far from the reference point" where the parameter is the distance from the reference point. In this respect and in one or more examples, the second condition may be considered to be the first condition not being met. In one or more other examples, the first and second condition may be defined with respect to unrelated parameters. For example, the first condition may comprise the user looking in a northerly direction and the second condition may be user looking towards their device. In this example, both conditions may, at certain times, be satisfied simultaneously and therefore one condition may be specified as having priority over the other condition such that the appropriate presentation mode may be selected. In one or more other examples, the presentation modes may only be selected if one of the first and second conditions is met, rather than both.

The first and second presentation modes may define one or more ways in which the first audio content (or parts thereof, such as the first user audio/ambient audio) is presented.

In one or more examples, the first presentation mode may comprise at least one of:
(i) providing for presentation of the first user audio at a volume greater than the ambient audio of the first audio content, such that it may be heard more clearly;
(ii) providing for presentation of the ambient audio as spatial audio such that it will be perceived by the second user 102 as originating from a smaller range of directions than in the second presentation mode, such that it may be less distracting;
(iii) providing for presentation of the ambient audio as spatial audio solely from a direction in front of the second user 102, such that it may be less distracting;
(iv) providing for presentation of the first user audio as spatial audio from a direction in front of the second user 102, such that it appears the first user 101 is directly addressing the second user 102;
(v) providing for presentation of the first user audio as spatial audio to be perceived as originating from a first location 300 in front of the second user and providing for presentation of the ambient audio as spatial audio to be perceived as originating from a second location 301 in front of the second user 102 further from the second user 102 than the first location, such that the first user audio is in the foreground and the ambient audio is in the background.

In one or more examples, the second presentation mode comprises at least one of:
(i) providing for presentation of the ambient audio at a greater volume than in the first presentation mode, such that when the first user 101 looks away, the second user 102 may appreciate the first user's aural environment;
(ii) providing for presentation of the ambient audio as spatial audio such that it will be perceived by the second user 102 as originating from a greater range of directions than in the first presentation mode, such that when the first user 101 looks away, the second user 102 may appreciate the first user's aural environment.

While the above example considers whether the first-user orientation information is indicative of one of two conditions, in other examples any number of conditions and corresponding presentation modes may be provided.

Figure 5:
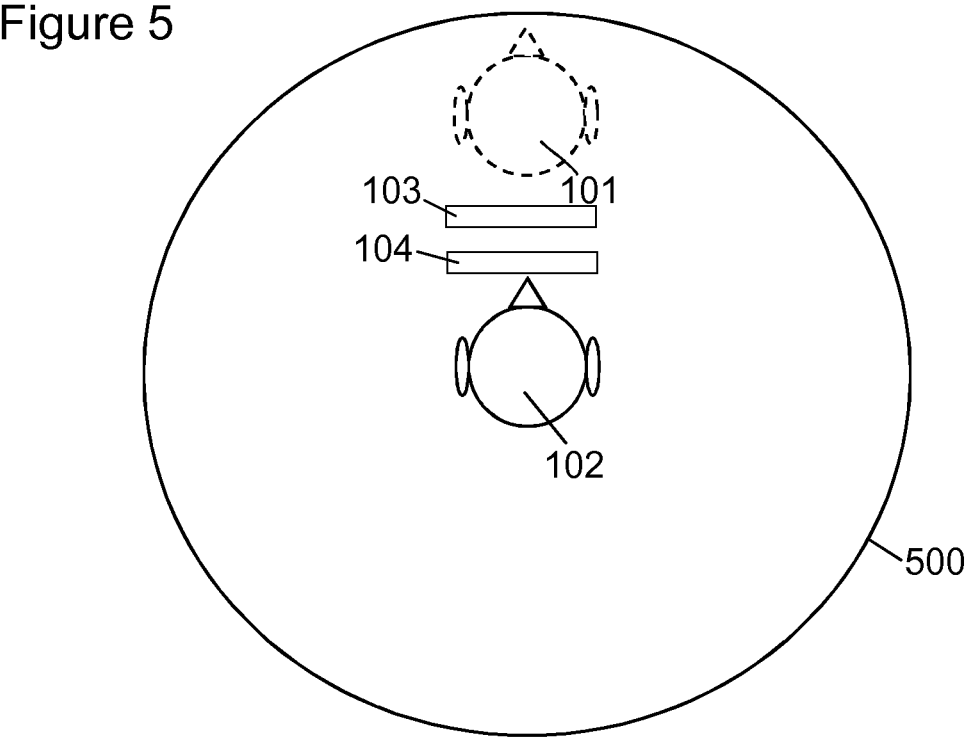
FIG. 5 shows a third diagram to illustrate an example of the presentation of audio to a second user based on the orientation of the first user.

Turning to example FIG. 5, the first-user orientation information is indicative of the first user 101 facing directly away from the first presentation device 103. In the event of such a condition, the apparatus 200 may cause a third presentation mode to be invoked. In FIG. 5 the ambient audio of the first audio content is presented as spatial audio to be perceived as originating from all directions represented by line 500 relative to the second user 102. As mentioned above, the ambient audio may comprise spatial audio content and may therefore include directional information from, for example, 360° around the first user 101. Thus, the spatial audio ambient audio may be presented as it was captured such that the ambient audio aural scene is reproduced for the second user including reproduction of the directions from which the ambient audio would have been heard by the first user.

It will be appreciated that the range of directions 301, 400, 500 over which the ambient audio is presented may be incrementally increased as the first user moves their head orientation from the first condition to the third condition. Accordingly, a plurality of incrementally different presentation modes may be provided. Alternatively, the first presentation mode may provide for presentation of the ambient audio from point 301 (or other desired location), while in the second presentation mode the range of directions 400, 500 may comprise a function of head orientation determined from the first-user orientation information.

The apparatus 200 may have particular application when one or both of the users 101, 102 are at locations where there is significant ambient noise. For example, the volume level or the ambient audio volume level of the first audio content is greater than a predetermined threshold level. Accordingly, the use of the first and second presentation modes based on the first-user orientation information indicating particular conditions, may be selectively applied.

The presentation of the first audio content using the first and second presentation modes may be based on a determination that the volume of the first audio content is greater than a predetermined threshold level. If it is above the predetermined threshold level for one or more of the users, then the apparatus may apply the presentation modes for the other of the users. When the volume of the first audio content is less than the predetermined threshold level, the apparatus may not use the first and second (and third etc.) presentation modes and instead, for example, provide for presentation of the first audio content independently of the first-user orientation information.

In other examples the selective application of the first and second presentation modes by the apparatus may be based on who initiated the telecommunication, i.e. the first user or the second user.

Figure 6:
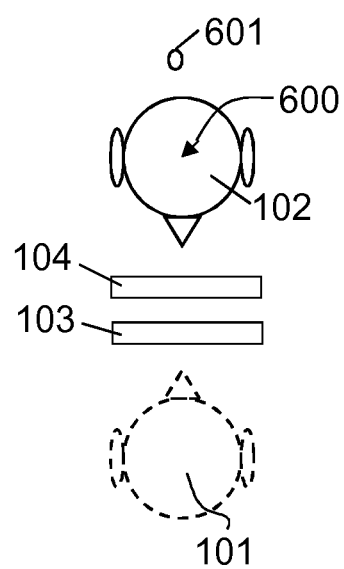
FIG. 6 shows a first diagram to illustrate an example of the presentation of audio to a first user based on the orientation of the first user.

Example FIGS. 6 and 7 show an example of the experience from the point of view of the first user 101 hearing the second user 102 i.e. second audio content. In some examples, the same apparatus 200 may provide for presentation of second user audio to the first user 101 and in other examples a different apparatus, which may be similar to apparatus 200, may perform such functionality.

FIG. 6 shows the same first condition as described above, in which the first user 101 is looking at the same predetermined reference point e.g. the second user 102 or at the first user device 103. FIG. 7 shows the same second or third condition as described above, in which the first user 101 is looking away (either partially like in FIG. 4 or fully like in FIG. 5) e.g. away from the first user device 103.

The second audio content comprises second user audio comprising audio determined to be generated by the second user 102 and ambient audio comprising audio other than that determined to be generated by the second user 102 and provided from the second communication device 104.

Based on the first user orientation information being indicative of the first condition, a first presentation mode for the first user 101 may be used (which may be called a first-user-first-presentation mode to avoid confusion). In the first-user-first-presentation mode, the second user audio may be presented as spatial audio such that it will be perceived from a location in front of the first user shown as 600. The ambient audio from the second user 102 may, in this example of the first-user-first-presentation mode, be presented as spatial audio such that it is perceived to originate from a location 601 behind the location 600 from which the first user 101 perceives the first user audio.

The first-user-first-presentation mode enables the first user 101 to hear the second user's voice and the second user's ambient audio, but it is not too distracting from the music concert experience.

Turning to FIG. 7, based on the first user orientation information being indicative of the second condition (the first user turned away from the device 103), a second presentation mode for the first user 101 may be used (which may be called a first-user-second-presentation mode to avoid confusion). In the first-user-second-presentation mode, the second user audio may be presented as spatial audio such that it will be perceived from a location shown as 600 relative to the first user 101, which may be based on where the first user device 103 is held. The ambient audio from the second user 102 may, in this example of the first-user-second-presentation mode, not be presented at all. Thus, the ambient audio from the second user 102 may be muted in the second condition e.g. when the second user looks away from their device 103.

Thus, in general, based on (i) second audio content from the second communication device 104 of the second user 102, the second user 102 in telecommunication with the first user 101 via the first communication device 103; and (ii) first-user orientation information indicative of one or more of the orientation and location of the first user 101 relative to the first communication device 103; the apparatus may be configured to provide for presentation of the second audio content at the first communication device 103 in a first-user-first-presentation mode when the first-user orientation information is indicative of a first condition and in a first-user-second-presentation mode, different to the first, when the first-user orientation information is indicative of a second condition different to the first condition, the first and second presentation modes providing for different presentation of the second audio content.

Accordingly, to summarise the action of the one or more apparatuses that provide the telecommunication session, based on first-user orientation information indicative of one or more of the orientation and location of the first user 101 relative to the first communication device 103, the apparatus(es) may be configured to provide for presentation of first audio content from the first user to the second user and second audio content from the second user to the first user in different presentation modes such that the audio content is presented differently dependent on the first-user orientation information being indicative of different conditions.

In any of the one or more examples, the ambient audio may be audio added to the first or second audio content based on an input by the first or second user respectively to act as ambient audio. Accordingly, the first or second user may choose a pre-recorded ambient audio track to act as ambient audio, as described in the examples above.

FIG. 8 shows a flow diagram illustrating the steps of, based at least in part on 800 (i) first audio content from a first communication device of a first user, the first user in telecommunication with a second user via a second communication device; and (ii) first-user orientation information indicative of one or more of the orientation and location of the first user relative to the first communication device; provide for presentation 801 of the first audio content at the second communication device in a first presentation mode when the first-user orientation information is indicative of a first condition and in a second presentation mode, different to the first, when the first-user orientation information is indicative of a second condition different to the first condition, the first and second presentation modes providing for different presentation of the first audio content.

FIG. 9 shows a flow diagram illustrating the steps of based at least in part on 900 (*i*) second audio content from a second communication device of a second user, the second user in telecommunication with a first user via a first communication device; and (ii) first-user orientation information indicative of one or more of the orientation and location of the first user relative to a reference point; providing for presentation 901 of the second audio content at the first communication device in a first presentation mode when the first-user orientation information is indicative of a first condition and in a second presentation mode, different to the first, when the first-user orientation information is indicative of a second condition different to the first condition, the first and second presentation modes providing for different presentation of the second audio content.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:
1. An apparatus comprising:
at least one processor; and
at least one memory including computer program code,
the at least one memory and the computer program code configured to, with the at least one processor, cause the apparatus to perform at least the following:
based at least in part on
first audio content comprising first user audio determined to be generated by a first user via a first communication device and ambient audio comprising other audio generated in a vicinity of the first communication device, wherein the first user is in telecommunication with a second user via a second communication device; and
first-user orientation information indicative of one or more of the orientation or location of the first user relative to a predetermined reference point;
provide for presentation of the first audio content at the second communication device in a first presentation mode when the first-user orientation information is indicative of the first user viewing the first communication device and is indicative of the first user being within a predetermined distance of the predetermined reference point, wherein in the first presentation mode, the apparatus is caused to provide for presentation of the first user audio as spatial audio to be perceived as originating from a first location in front of the second user and to provide for presentation of the ambient audio as spatial audio to be perceived as originating from a second location in front of the second user further from the second user than the first location, and in a second presentation mode, different to the first, when the first-user orientation information is indicative of the first user looking away from the first communication device and is indicative of the first user is further than the predetermined distance from the predetermined reference point, wherein the first and second presentation modes provide for different presentation of at least the ambient audio.
2. The apparatus according to claim 1, wherein
the first and second presentation modes provide for different presentation of the ambient audio in terms of a first audio presentation characteristic; and
the first and second presentation modes provide for one of different presentation of the first user audio, said different presentation in terms of a second audio presentation characteristic, different to the first audio presentation characteristic; or no difference in presentation of the first user audio.
3. The apparatus according to claim 1, wherein the first audio content is presented as spatial audio such that it is perceived as originating from a particular direction or range of directions, and the ambient audio is presented as originating from a different particular direction or range of directions in each of the first and second presentation modes.
4. The apparatus according to claim 1, wherein the first presentation mode comprises at least one of:
providing for presentation of the ambient audio as spatial audio such that it will be perceived by the second user as originating from a smaller range of directions than in the second presentation mode;
providing for presentation of the ambient audio as spatial audio solely from a direction in front of the second user; or providing for presentation of the first user audio as spatial audio from a direction in front of the second user.
5. The apparatus according to claim 1, wherein the second presentation mode comprises at least one of:
providing for presentation of the ambient audio at a greater volume than in the first presentation mode; or
providing for presentation of the ambient audio as spatial audio such that it will be perceived by the second user as originating from a greater range of directions than in the first presentation mode.
6. The apparatus according to claim 1, wherein the first audio content comprises audio-type information which designates which audio of the first audio content comprises ambient audio and which audio comprises audio generated by the first user.
7. The apparatus according to claim 1, wherein the first audio content comprises first spatial audio content, the first spatial audio content comprising the ambient audio and information indicative of at least the direction from which the ambient audio was captured, the apparatus configured to provide for presentation of the first spatial audio content at the second communication device as spatial audio at least in one of the first and second presentation modes.
8. The apparatus according to claim 1, wherein the provision of the presentation of the first audio content is further based on a determination that the volume of the first audio content is greater than a predetermined threshold level;
wherein the apparatus is configured, if the volume of the first audio content is less than the predetermined threshold level, to provide for presentation of the first audio content independently of the first-user orientation information.
9. The apparatus according to claim 1, wherein the first-user orientation information is based at least in part on camera imagery captured by the first user device of the first user during said telecommunication.
10. An apparatus comprising:
at least one processor; and
at least one memory including computer program code,
the at least one memory and the computer program code configured to, with the at least one processor, cause the apparatus to perform at least the following:
based on
second audio content comprising second user audio determined to be generated by a second user via a second communication device and ambient audio comprising other audio generated in a vicinity of the second communication device, wherein the second user is in telecommunication with a first user via a first communication device; and
first-user orientation information indicative of one or more of the orientation and location of the first user relative to a reference point;
provide for presentation of the second audio content at the first communication device in a first presentation mode when the second-user orientation information is indicative of the second user viewing the second communication device and is indicative of the first user being within a predetermined distance of the predetermined reference point, wherein in the first presentation mode, the apparatus is caused to provide for presentation of the second user audio as spatial audio to be perceived as originating from a first location in front of the first user and to provide for presentation of the ambient audio as spatial audio to be perceived as originating from a second location in front of the first user further from the first user than the first location, and in a second presentation mode, different to the first, when the second-user orientation information is indicative of the second user looking away from the second communication device and is indicative of the first user is further than the predetermined distance from the predetermined reference point, wherein the first and second presentation modes provide for different presentation of at least the ambient audio.

11. The apparatus according to claim 10, wherein the second audio content comprises second user audio comprising audio determined to be generated by the second user and second ambient audio comprising audio other than that generated by the second user that is captured by the second communication device; and
in the first presentation mode, provide for presentation of the second ambient audio; and
in the second presentation mode, one of provide for presentation of the second ambient audio at a lower volume than in the first presentation mode or do not provide for presentation of the second ambient audio.

12. A method comprising:
based at least in part on
(i) first audio content comprising first user audio determined to be generated by a first user via a first communication device and ambient audio comprising other audio generated in a vicinity of the first communication device, wherein the first user is in telecommunication with a second user via a second communication device; and
(ii) first-user orientation information indicative of one or more of the orientation and location of the first user relative to a predetermined reference point;
providing for presentation of the first audio content at the second communication device in a first presentation mode when the first-user orientation information is indicative of the first user viewing the first communication and is indicative of the first user being within a predetermined distance of the predetermined reference point, wherein in the first presentation mode, the apparatus is caused to provide for presentation of the first user audio as spatial audio to be perceived as originating from a first location in front of the second user and to provide for presentation of the ambient audio as spatial audio to be perceived as originating from a second location in front of the second user further from the second user than the first location, and in a second presentation mode, different to the first, when the first-user orientation information is indicative of the first user looking away from the first communication device and is indicative of the first user is further than the predetermined distance from the predetermined reference point, wherein the first and second presentation modes provide for different presentation of at least the ambient audio.

13. The method according to claim 12, wherein
the first and second presentation modes provide for different presentation of the ambient audio in terms of a first audio presentation characteristic; and
the first and second presentation modes provide for one of different presentation of the first user audio, said different presentation in terms of a second audio presentation characteristic, different to the first audio presentation characteristic; or no difference in presentation of the first user audio.

14. The method according to claim 12, wherein the first audio content is presented as spatial audio such that it is perceived as originating from a particular direction or range of directions, and the ambient audio is presented as originating from a different particular direction or range of directions in each of the first and second presentation modes.

15. The method according to claim 12, wherein the first presentation mode comprises at least one of:
providing for presentation of the ambient audio as spatial audio such that it will be perceived by the second user as originating from a smaller range of directions than in the second presentation mode;
providing for presentation of the ambient audio as spatial audio solely from a direction in front of the second use;
providing for presentation of the first user audio as spatial audio from a direction in front of the second user; or
providing for presentation of the first user audio as spatial audio to be perceived as originating from a first location in front of the second user and providing for presentation of the ambient audio as spatial audio to be perceived as originating from a second location in front of the second user further from the second user than the first location.

16. The method according to claim 12, wherein the second presentation mode comprises at least one of:
providing for presentation of the ambient audio at a greater volume than in the first presentation mode; or
providing for presentation of the ambient audio as spatial audio such that it will be perceived by the second user as originating from a greater range of directions than in the first presentation mode.

17. The method according to claim 12, wherein the first audio content comprises audio-type information which designates which audio of the first audio content comprises ambient audio and which audio comprises audio generated by the first user.

18. A non-transitory computer readable medium comprising program instructions stored thereon for performing at least the following:
based at least in part on
first audio content comprising first user audio determined to be generated by a first user via a first communication device and ambient audio comprising other audio generated in a vicinity of the first communication, wherein the first user is in telecommunication with a second user via a second communication device; and
first-user orientation information indicative of one or more of the orientation and location of the first user relative to a predetermined reference point;
providing for presentation of the first audio content at the second communication device in a first presentation mode when the first-user orientation information is indicative of the first user viewing the first communication device and is indicative of the first user being within a predetermined distance of the predetermined reference point, wherein in the first presentation mode, the apparatus is caused to provide for presentation of the first user audio as spatial audio to be perceived as originating from a first location in front of the second user and to provide for presentation of the ambient audio as spatial audio to be perceived as originating from a second location in front of the second user further from the second user than the first location, and in a second presentation mode, different to the first, when the first-user orientation information is indicative of the first user looking away from the first communication device and is indicative of the first user is further than the predetermined distance from the predetermined reference point, wherein the first and second presentation modes providing for different presentation of at least the ambient audio.

19. The apparatus according to claim 1, wherein the at least one memory and the computer program code are further configured to, with the at least one processor, cause the apparatus to:
provide for presentation of the first user audio at a volume greater than the ambient audio of the first audio content, while in the first presentation mode; and
provide for presentation of the ambient audio of the first audio content at a volume greater than the first user audio, while in the second presentation mode.

* * * * *

UNITED STATES PATENT AND TRADEMARK OFFICE
CERTIFICATE OF CORRECTION

PATENT NO. : 11,399,254 B2
APPLICATION NO. : 16/967341
DATED : July 26, 2022
INVENTOR(S) : Antti Eronen et al.

It is certified that error appears in the above-identified patent and that said Letters Patent is hereby corrected as shown below:

In the Claims

In Column 22, Line 59, Claim 10, delete "first user" and insert -- second user --, therefor.

In Column 23, Line 5, Claim 10, delete "first user is" and insert -- second user being --, therefor.

In Column 23, Line 51, Claim 12, delete "user is" and insert -- user being --, therefor.

In Column 24, Line 65, Claim 18, delete "user is" and insert -- user being --, therefor.

Signed and Sealed this
Thirtieth Day of May, 2023

Katherine Kelly Vidal
*Director of the United States Patent and Trademark Office*